United States Patent Office 3,833,553
Patented Sept. 3, 1974

3,833,553
METHOD OF PRODUCING α-L-ASPARTYL-L-PHENYLALANINE ALKYL ESTERS
Yasuo Ariyoshi, Tetsuo Yamatani, Noboru Uchiyama, Naohiko Yasuda, and Koji Toi, Kanagawa, and Naotake Sato, Tokyo, Japan, assignors to Ajinomoto Co., Inc., Tokyo, Japan
No Drawing. Continuation-in-part of application Ser. No. 108,555, Jan. 21, 1971, now Patent No. 3,798,206. This application July 5, 1972, Ser. No. 269,044
Claims priority, application Japan, Jan. 31, 1970, 45/8,742; Feb. 23, 1970, 45/15,401; June 26, 1970, 45/55,722; Dec. 30, 1970, 46/128,706; July 9, 1971, 46/50,877
The portion of the term of the patent subsequent to Mar. 19, 1991, has been disclaimed
Int. Cl. C07c *103/52*; A23l *1/26*
U.S. Cl. 260—112.5    6 Claims

ABSTRACT OF THE DISCLOSURE

When salts of L-aspartic anhydride with strong acids are reacted with lower alkyl esters of L-phenylalanine to produce the corresponding L-aspartyl-L-phenylalanine esters, a significant increase in yield and in the proportion of the α-isomer is obtained when the reaction mixture contains a sufficient amount of a weak acid, that is, an acid having a dissociation constant smaller than $3 \times 10^{-2}$ at 25° C. The α-isomer is a known sweetener.

---

This application is a continuation-in-part of our copending application Ser. No. 108,555, filed on Jan. 21, 1971, now U.S. Pat. No. 3,798,206.

This invention relates to α-L-aspartyl-L-phenylalanine alkyl esters, and particularly to a method of producing the lower alkyl esters of α-L-aspartyl-L-phenylalanine which are known sweetening agents.

As has been pointed out in more detail in the aforecited copending application, the methods of preparing L-aspartyl-L-phenylalanine esters known prior to our earlier application required many steps and relatively expensive reagents so that the esters could not be prepared under economically attractive conditions suitable for manufacture on an industrial scale, particularly in view of the simultaneous formation of β-L-aspartyl-L-phenylalanine esters, bitter materials which can be removed from the α-isomers without great difficulty, but have no known utility. As disclosed and claimed in the earlier application, the lower alkyl esters of L-aspartyl-L-phenylalanine are produced in good yields in a single step by the reaction of a salt of L-aspartic anhydride and a strong acid, such as dichloroacetic acid or a stronger acid, with a lower alkyl ester of L-phenylalanine. The product obtained consists predominantly of the desired α-isomer.

It has now been found that the overall yield of L-aspartyl-L-phenylalanine and the proportion of the α-isomer in the reaction product can be increased significantly when the reaction mixture contains a sufficient amount of a weak acid, the term being employed herein to refer to acids which have a dissociation constant lower than $3 \times 10^{-2}$ at 25° C. If an acid has more than one ionizable hydrogen atom, the dissociation constant for the first hydrogen of a weak acid is below $3 \times 10^{-2}$.

Typical weak acids for use in the improved method of the invention are phosphoric acid, phosphorous acid, carbonic acid, formic acid, acetic acid, succinic acid, and phenol. Carbon dioxide is similarly effective. It forms acid in the presence of water, and $CO_2$ appears to form carbamic acids with available amino groups.

The primary reactants in the formation of α-L-aspartyl-L-phenylalanine lower alkyl ester are the corresponding ester of phenylalanine and a salt of aspartic anhydride with an acid as strong as dichloroacetic acid or stronger. The methyl and ethyl esters are preferred, the propyl esters are useful, but esters of phenylalanine with alkanols having more than four carbon atoms have a sweet taste too weak to be suitable as sweeteners, and the butyl esters are of marginal value. The lower alkyl esters referred to in this application thus have 1 to 4 carbon atoms in their alkyl group.

The phenylalanine esters are employed in amounts at least equimolecular to the aspartic anhydride salt, and an excess of the ester is preferred, but nothing is gained by employing a very large excess so that the preferred mole ratio of phenylalanine ester to aspartic anhydride salt is between 1.5:1 and 6:1. Significant improvements in the yield of the desired α-L-aspartyl-L-phenylalanine ester can be observed in many cases when the weak acid is present in the reaction mixture in an amount as small as 0.1 mole per mole of the phenylalanine ester, and no further improvement can be achieved by increasing the mole ratio of weak acid to phenylalanine ester beyond 10:1. It is not usually economical to exceed a ratio of 5:1.

The reaction is performed in any liquid medium which is inert to the reactants and to the product. The classes of suitable inert solvents or diluents (and typical representatives of these classes) include water, alcohols (methanol, ethanol, isopropanol, ethyleneglycol), ketones (acetone, methylethylketone), ethers (diethyl ether, tetrahydrofuran, dioxane), nitriles (acetonitrile), esters (ethyl acetate, methyl propionate), halogenated hydrocarbons (chloroform, dichloromethane, ethylene dichloride), hydrocarbons (toluene, xylene, hexane, cyclohexane), amides (dimethylformamide), lactones (γ-butyrolactone), and nitrohydrocarbons (nitromethane). Obviously, this list can be extended almost indefinitely, and the variety of solvent systems available is further increased by mixtures of the solvents enumerated and others.

The strong acids providing the acid moiety in the aspartic anhydride salts include the strong mineral acids such as hydrogen chloride, hydrogen bromide, and sulfuric acid, but also the monoesters of sulfuric acid such as methylsulfuric acid, isopropylsulfuric acid, and benzylsulfuric acid, organic sulfonic acids such as benzenesulfonic acid, p-toluenesulfonic acid, β-naphthalenesulfonic acid, and halogenated carboxylic acids such as trichloroacetic acid, trifluoroacetic acid, and dichloroacetic acid, the latter being representative of the acids of marginal strength which may still be termed "strong acids" for the purpose of this invention.

The reaction temperature is not critical because of the high reactivity of the L-aspartic acid anhydride salts and the phenylalanine esters. The reaction proceeds at ordinary room temperature, and the reaction rate increases with temperature. At temperatures of 60° C. or more, the reactants tend to racemize at an undesirable rate which further increases with temperature. It is preferred to hold the reaction temperature limit below about 10° C. because the highest yield of the desired α-isomer is usually obtained at such low temperatures. There is no critical lower temperature other than that set by solidification of the liquid solvent or diluent employed.

The sequence in which the reactants are combined is a matter of choice. It is usually most convenient to dissolve or disperse the phenylalanine ester in the inert solvent or diluent and to add the aspartic anhydride salt and the weak acid to the solution or dispersion with stirring. One may also start by preparing a solution or dispersion of the aspartic acid in an inert liquid medium, and admix a suspension or dispersion of the phenylalanine ester, the weak acid being mixed with either component prior to the addition.

When an inert, water-soluble, organic solvent or diluent is employed, the work-up of the reaction mixture starts with the evaporation of the inert liquid in a vacuum. The residue is dissolved in water, and the aqueous solution is extracted with ethyl acetate or ethylene dichloride to remove unreacted phenylalanine ester. The L-aspartyl-L-phenylalanine ester is recovered from the aqueous layer by partial evaporation in a vacuum. When the inert reaction medium is insoluble in water, the reaction mixture is extracted with water at a pH of about 5, and the dipeptide ester is recovered from the aqueous layer while unreacted phenylalanine ester remains in the organic solvent phase. If water is the solvent or diluent, recovery starts with solvent extraction for removal of the unreacted excess of phenylalanine ester.

The L-aspartyl-L-phenylalanine ester obtained mainly consists of the desired $\alpha$-isomer which can be purified of the bitter-tasting $\beta$-isomer by recrystallization. However, the two isomers differ in so many respects that several other separation methods are practical. The hydrochloride of the $\alpha$-isomer is so much less soluble in water than that of the $\beta$-isomer, that the $\alpha$-isomer can be precipitated in pure, crystalline form from an aqueous solution of the isomer mixture by the addition of hydrochloric acid. When a mixture of the isomers is treated with acetone or methylethylketone, only the $\alpha$-isomer goes into solution as a 4-imidazolidinone derivative from which the pure $\alpha$-isomer can be recovered by hydrolysis. Only the $\alpha$-isomer forms adducts with cinnamic acid, $\beta$-resorcyclic acid, 3,5-dinitrophenol, and gentisic acid in aqueous media, and the adducts are readily decomposed.

The following examples further illustrate the invention. In these examples, the indicated yields are based on the aspartic anhydride salt used as a starting material. The amounts of $\alpha$- and $\beta$-isomer in the product were determined by paper electrophoresis in aqueous acetic acid (pH 2.8) at 25 v./cm. The chromatogram was stained with cadmium ninhydrin reagent by the method of J. Heilman et al. [Z. Physiol. Chem. 309 (1957) 219], the two spots corresponding to the two isomers were excised, extracted with methanol, and the absorbances of the extracts were measured at 510 m$\mu$.

EXAMPLE 1

4.32 g. (20 millimole) L-phenylalanine methyl ester hydrochloride was dissolved in 20 ml. water, and the solution was neutralized with 1.8 g. sodium bicarbonate. The liberated L-phenylalanine methyl ester was extracted twice with 25 ml. ethylene dichloride, and the combined extracts were dried with anhydrous sodium sulfate and evaporated to dryness in a vacuum.

The residue was dispersed in 60 ml. of a mixture of ethyl acetate and methanol (5:1 by volume). 1.37 g. (5 millimole) L-aspartic anhydride benzenesulfonate and 1.11 g. solid carbon dioxide were added to the dispersion, and the resulting solution was stirred at −30° C. for 30 minutes.

The reaction mixture was then extracted with water, and the aqueous extract was washed with ethyl acetate. It contained L-aspartyl-L-phenylalanine methyl ester in a yield of 89%, of which 73% was $\alpha$-isomer and 16% $\beta$-isomer.

When the same procedure was repeated except for the omission of the carbon dioxide, the total yield was 78%, 55% being $\alpha$-isomer and 23% $\beta$-isomer.

The use of a solvent system of 5 parts ethylene dichloride and one part methanol in the presence of 1.76 g. carbon dioxide under otherwise unchanged conditions yielded 69% $\alpha$-isomer and 20% $\beta$-isomer, based on the initially used aspartic anhydride benzenesulfonate. When the carbon dioxide addition was omitted, 49% $\alpha$-isomer and 27% $\beta$-isomer were obtained.

EXAMPLE 2

20 millimole L-phenylalanine ethyl ester, 5 millimole L-aspartic anhydride benzenesulfonate, and 1.11 g. carbon dioxide were stirred 30 minutes at −10° C. in a mixture of 50 ml. ethylene dichloride and 10 ml. methanol substantially as in Example 1, and 68% $\alpha$-isomer and 18% $\beta$-isomer of L-aspartyl-L-phenylalanine ethyl ester were obtained.

In a control run, the carbon dioxide was omitted, and the yield amounted to 47% $\alpha$-isomer and 24% $\beta$-isomer.

EXAMPLE 3

86 g. (0.4 mole) L-phenylalanine methyl ester hydrochloride was dissolved in 500 ml. water and neutralized with 25 g. sodium bicarbonate. The ester solution was extracted with 400 ml. and again with 350 ml. ethylene dichloride, 8.8 g. carbon dioxide were added to the combined extracts at −20° C., and thereafter 15.2 g. L-aspartic anhydride hydrochloride. The mixture was stirred at −20° C. for 30 minutes and was then found to contain 65% $\alpha$-L-aspartyl-L-phenylalanine methyl ester and 26% of the $\beta$-isomer.

It was heated by adding 350 ml. water at 70° C. and made alkaline by adding 300 ml. water containing 5.7 g. sodium carbonate. Upon shaking, the L-aspartyl-L-phenylalanine was transferred to the aqueous phase while the unreacted excess of phenylalanine methyl ester accumulated in the organic phase. The aqueous phase was separated, washed twice with 150 ml. ethylene dichloride, adjusted to pH 4.8, and evaporated in a vacuum to remove most water. The residue was mixed with 30 ml. concentrated hydrochloric acid, and the solution, having a volume of 135 ml., was stored in a refrigerator overnight.

Crystals weighing 21.5 g. were recovered by filtering and drying. They consisted of $\alpha$-L-aspartyl-L-phenylalanine methyl ester hydrochloride having a purity greater than 99% as determined by electrophoretic analysis on paper.

21 g. crystals were dissolved in 200 ml. water, the solution was adjusted to pH 4.8 with sodium carbonate, and stored overnight in a refrigerator. The crystals formed were recovered, weighed 15.3 g., and consisted of pure $\alpha$-aspartyl-L-phenylalanine methyl ester free from detectable traces of the $\beta$-isomer. Based on the L-aspartic anhydride hydrochloride initially employed, this amounts to a recovered, pure yield of 51%.

When the above procedure was repeated in the absence of carbon dioxide, the $\alpha$-isomer yield, as determined in the initial reaction mixture, decreased from 65% to 51%, while the $\beta$-isomer increased from 26% to 32%.

EXAMPLE 4

An ethylene dichloride solution of phenylalanine methyl ester was prepared as in Example 3. 8 ml. methanol, 8.8 g. carbon dioxide, and 15.2 g. L-aspartic anhydride hydrochloride were added at −20° C., and the mixture was stirred for 30 minutes. It was found to contain 64% of the desired $\alpha$-isomer of L-aspartyl-L-phenylalanine methyl ester and 18% of the $\beta$-isomer. The same procedure without carbon dioxide yielded 51% $\alpha$-isomer and 24% $\beta$-isomer.

When the ethyl ester was substituted in the above procedure for the phenylalanine methyl ester in an equimolecular amount, and the reaction with L-aspartic anhydride hydrochloride was performed at −25° C., the $\alpha$-isomer yield was 63% and the $\beta$-isomer yield 22% in the presence of carbon dioxide, and the omission of the carbon dioxide changed the yields to 49% and 30% respectively.

EXAMPLE 5

Three batches of a solution of 40 millimole L-phenylalanine methyl ester in 75 ml. ethylene dichloride were prepared as in Example 3 and evaporated in a vacuum to remove the solvent. 1.76 g. carbon dioxide dissolved in 75 ml. ethyl acetate was added to the residue of the first batch at −20° C., and the solution so obtained was further stirred at the same temperature with 10 millimole of the methylsulfuric acid salt of L-aspartic anhydride for 30 minutes.

The reaction mixture was found to contain α-L-aspartyl-L-phenylalanine methyl ester in a yield of 55%, the β-isomer in a yield of 12%. When the above procedure was repeated in the absence of carbon dioxide, the α-isomer yield dropped to 50%, the β-isomer yield rose to 14%.

The second batch of L-phenylalanine methyl ester free from solvent was dispersed in a mixture of 0.88 g. carbon dioxide, and 75 ml. ethylene dichloride at −20° C., and the solution was stirred at −20° C. with 10 millimole of the methylsulfuric acid salt of L-aspartic anhydride for 30 minutes.

The yield of α-L-aspartyl-L-phenylalanine methyl ester in the reaction mixture was 51% and that of the β-isomer was 13%. 45% α-isomer and 12% β-isomer were found in a reaction mixture produced in a control test without carbon dioxide.

In processing the third batch, the procedure employed with the second batch was repeated except for an addition of 0.75 ml. methanol to the solvent and a reaction temperature of −25° C. The yields of α-isomer were 64% and 49%, those of the β-isomer 10% and 12% respectively with and without carbon dioxide.

EXAMPLE 6

Two batches of 40 millimole L-phenylalanine methyl ester free from solvent were prepared as in Example 5. The first batch was stirred at −20° C. in a mixture of 75 ml. ethyl acetate and 0.75 ml. methanol with 0.88 g. carbon dioxide and 10 millimole of the isopropylsulfuric acid salt of L-aspartic anhydride for 30 minutes. The reaction mixture was then found to contain α-L-aspartyl-L-phenylalanine methyl ester in a yield of 60, the yield of the β-isomer being 12%. Omission of the carbon dioxide in a control run changed these yields to 46% and 15% respectively.

The second batch was processed as the first batch, but the solvent system employed consisted of 75 ml. ethylene dichloride and 2.3 ml. methanol. The yields were 60% for the α-isomer, 17% for the β-isomer. A control run without carbon dioxide produced 48% α-isomer and 16% β-isomer.

EXAMPLE 7

Two batches of 40 millimole L-phenylalanine methyl ester free from solvent were prepared as in Example 5. The first batch was stirred at −20° C. in a mixture of 75 ml. ethyl acetate and 1.5 ml. methanol with 0.88 g. carbon dioxide and 10 millimole of the benzylsulfuric acid salt of L-aspartic anhydride for 30 minutes. The yield of α-L-aspartyl-L-phenylalanine methyl ester in the reaction mixture was 53%, and that of the β-isomer was 12%. Omission of the carbon dioxide in a control run reduced the yield of α-isomer to 45% without affecting the β-isomer.

In processing the second batch, the solvent system was changed to 75 ml. ethylene dichloride and 0.75 ml. methanol, and the reaction temperature was lowered to −25° C., all other conditions being unchanged. The two isomers were found in the reaction mixture in respective yields of 47% and 12%. A control run without carbon dioxide yielded 41% and 13% respectively.

The salts of L-aspartic anhydride with methylsulfuric acid, isopropylsulfuric acid, and benzylsulfuric acid referred to in Examples 5 to 7 may be replaced by the corresponding salts of ethylsulfuric, propylsulfuric, 2,3-dibromopropylsulfuric, butylsulfuric, sec-butylsulfuric, allylsulfuric acid and their higher homologs. The cyclohexyl- and cyclopentylsulfates are equally effective, and other useful salts of L-aspartic anhydride are those with cinnamylsulfuric, phenylsulfuric, p-chlorophenyl- and p-methylphenylsulfuric acid.

The manner of preparing these salts from alcohols or phenols under anhydrous conditions by reaction with an intermediate mixed anhydride of aspartic, sulfuric, and acetic acid is described in more detail in the simultaneously filed, commonly owned application of Yasuo Ariyoshi et al., Ser. No. 269,043.

It is an important advantage of the salts of aspartic anhydride with the monoesters of sulfuric acid that they are crystalline and are readily obtained in a pure state.

EXAMPLE 8

7.16 g. (40 millimole) L-phenylalanine methyl ester was dissolved in 75 ml. of a methanol-ethylene dichloride mixture (5:95 by volume), and 3.3 millimole phosphoric acid, and 1.52 g. (10 millimole) L-aspartic anhydride hydrochloride were added at −20° C., whereupon the mixture was stirred at that temperature for 10 minutes. It was then found to contain α-L-aspartyl-L-phenylalanine methyl ester in a yield of 65.8% based on the aspartic anhydride salt originally employed.

Except for the use of phosphoric acid instead of carbon dioxide, the conditions employed were closely similar to those of Example 4, and the results achieved were almost the same.

EXAMPLE 9

8.6 g. (40 millimole) L-phenylalanine methyl ester hydrochloride was converted to the free ester as in Example 5, and the ester free from solvent was dissolved in 75 ml. ethyl acetate and 0.75 ml. methanol. The solution was mixed with 0.6 g. acetic acid and 2.3 g. (10 millimole) of the methylsulfuric acid salt of L-aspartic anhydride.

After 30 minutes stirring at −25° C., the reaction mixture was found to contain α-L-aspartyl-L-phenylalanine methyl ester in a yield of 59%, and the β-isomer in a yield of 11%.

The omission of the acetic acid in an otherwise identical control run reduced the yield of α-isomer to 49% while increasing that of the β-isomer to 15%.

When a solvent medium of 75 ml. ethylene dichloride and 0.75 ml. methanol was employed in conjunction with 0.6 g. acetic acid in the above procedure, the yield of α-isomer was 60%, that of β-isomer 11%.

EXAMPLE 10

7.16 g. (40 millimole) L-phenylalanine methyl ester was dissolved in 75 ml. of a mixture of ethylene dichloride and methanol (99:1 by volume). 0.69 g. formic acid and 1.5 g. (10 millimole) L-aspartic anhydride hydrochloride were added in sequence, and the mixture was stirred at −20° C. for 10 minutes. It was then found to contain α-L-aspartyl-L-phenylalanine methyl ester in a yield of 62.2%.

What is claimed is:

1. A method of preparing an α-L-aspartyl-L-phenylalanine-lower-alkyl ester which comprises:
    (a) reacting a salt of L-aspartic anhydride and an acid at least as strong as dichloroacetic acid with a lower alkyl ester of L-phenylalanine in a liquid medium in the presence of a weak acid having a dissociation constant of less than $3 \times 10^{-2}$ in aqueous solution at 25° C. for the first ionizable hydrogen thereof,
        (1) said lower alkyl having not more than four carbon atoms,
        (2) the mole ratio of said salt and said ester of L-phenylalanine being between 1:1 and 1:6,
        (3) the amount of said weak acid being sufficient to increase the yield of said α-L-aspartyl-L-phenylalanine-lower-alkyl ester over the yield obtained in the absence of said weak acid under otherwise unchanged conditions; and (b) recovering the α-L-aspartyl-L-phenylalanine-lower-alkyl ester formed by said reacting.

2. A method as set forth in claim 1, wherein said salt is reacted with said ester of L-phenylalanine at a temperature lower than 60° C.

3. A method as set forth in claim 2, wherein the mole ratio of said weak acid to said ester of L-phenylalanine is between 0.1:1 and 10:1.

4. A method as set forth in claim 2, wherein said strong acid is a monoester of sulfuric acid, and said salt is crystalline.

5. A method as set forth in claim 3, wherein said weak acid is phosphoric acid, phosphorous acid, carbonic acid, formic acid, acetic acid, succinic acid, or phenol.

6. A method as set forth in claim 3, wherein said weak acid is formed by introducing carbon dioxide into said medium.

References Cited

UNITED STATES PATENTS 3,492,131   1/1970   Schlatter et al. _____ 260—112.5

OTHER REFERENCES

Kovacs et al., J. Am. Chem. Soc., *85* 1839 (1963).
Le Quesne et al., J. Chem. Soc., 24 (1952).

LEWIS GOTTS, Primary Examiner

R. J. SUYAT, Assistant Examiner

U.S. Cl. X.R.
260—471 A